United States Patent [19]

Martinčič et al.

[11] Patent Number: 4,728,215
[45] Date of Patent: Mar. 1, 1988

[54] CORNER CONNECTION FOR FURNITURE

[76] Inventors: Vinko Martinčič; Anton Martincic, both of Pudob 33, 61386 Stari Trg Pri Ložu, Yugoslavia

[21] Appl. No.: 903,921

[22] Filed: Sep. 5, 1986

[30] Foreign Application Priority Data

Sep. 6, 1985 [YU] Yugoslavia ............................ 1400/85

[51] Int. Cl.$^4$ ............................ B25G 3/00; F16B 7/08
[52] U.S. Cl. .................................... 403/231; 403/245; 403/407.1
[58] Field of Search ............... 403/407.1, 406.1, 405.1, 403/19, 231, 245, 252, 348, 350, 323, 263, 354, 376, 380

[56] References Cited

U.S. PATENT DOCUMENTS

| 3,331,623 | 7/1967 | Baresel et al. | 403/231 |
| 4,332,495 | 6/1982 | Bürgers | 403/376 |
| 4,579,474 | 4/1986 | Röck et al. | 403/323 |

FOREIGN PATENT DOCUMENTS

| 2855216 | 7/1979 | Fed. Rep. of Germany | 403/254 |
| 3309799 | 10/1983 | Fed. Rep. of Germany | 403/376 |
| 1467282 | 12/1966 | France | 403/405 |
| 2098698 | 11/1982 | United Kingdom | 403/376 |

Primary Examiner—Randolph A. Reese
Assistant Examiner—Peter M. Cuomo
Attorney, Agent, or Firm—Pollock, Vande Sande & Priddy

[57] ABSTRACT

The invention relates to a corner connection for furniture, namely for non-metal parts of furniture, containing a rotary eccentric worm and a binding bolt. The head 7 of the bolt 2 enters into a pair of oblique surface portions 6 arranged along a gap-like cutout 5 on the inner side of the sleeve eccentric worm 1, the bottom 6a of which oblique surface portions beginning at the mouth of the cutout 5 essentially on the mantle surface of the worm 1 and ending at the semicircular termination of the cutout 5 essentially on the inner surface of the worm 1.

4 Claims, 5 Drawing Figures

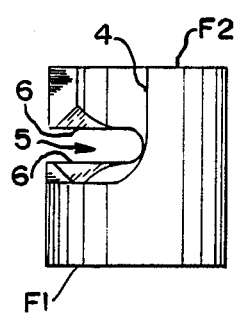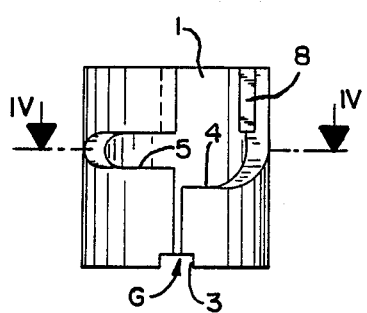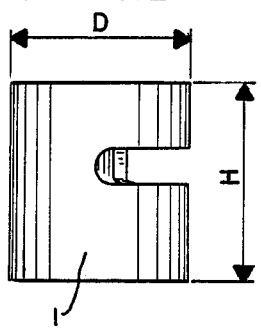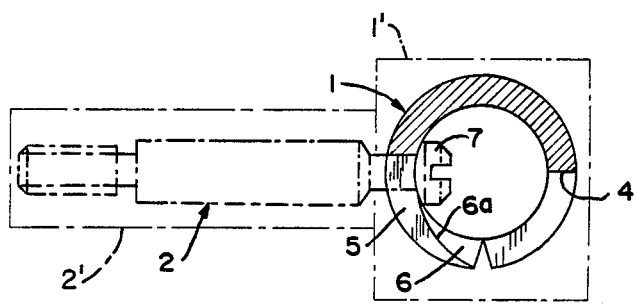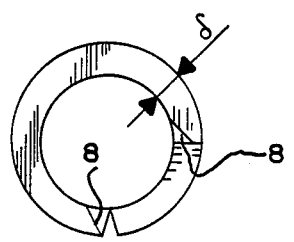

CORNER CONNECTION FOR FURNITURE

BACKGROUND OF THE INVENTION

The invention refers to the area of furniture connections, particularly to a metal corner connection for non-metal parts of furniture.

TECHNICAL PROBLEM

The invention is based on solving the problem of how constructing a rotary eccentric worm for tightening the binding bolt so that the outer diameter of the eccentric worm will be smaller than or, at the most, equal to its height, i.e. the dimension measured in the axial direction, and that it will be possible to use known usual binding bolts.

PRIOR ART

Corner connections for furniture containing an eccentric worm for insertion into a previously made bore in a first element of furniture and a binding bolt, whose threaded end section is screwed into a nut element in another element of furniture, are commonly known (see, for example, leaflet of HUWIL-WERKE, 5224 Ruppichteroth Federal Republic of Germany).

The known eccentric worm is an element made of pressure-cast light metal with an outer diameter of 25 mm and a height of 12 mm, which means that the ratio between the diameter and the height is greater than 2. This element is mainly composed of two mutually interspaced, essentially circular disks, which are interconnected by means of material through a circumferential prismatic intermediate section having a circular segment-like cross-section, whose arc length amounts to approximately one quarter of the disk circumference (if the latter is generalized to an ideal circular shape). The remaining interspace between the disks is, in its central area, clear for inserting a screwdriver and a covering plate, respectively. One part of the circumference is cut out for inserting the head of the binding bolt during assembly. The remaining free section of the circumference is equipped with a two-piece inner thickening, which begins on the outer circumference, widens inwardly in a spiral-like manner and ends at the circumferential binding intermediate section.

The binding bolt is composed of a threaded pin, which continues into a cylindrical shaft proceeding into a neck and finally into a head, which has a notch for inserting the screwdriver. The head is lentil-shaped in axial cross-section in order to reach an ideal bearing therefrom the spiral thickenings of the eccentric worm.

Due to material savings and technological demands at pressure casting, the eccentric worm is thin-walled, and since the lentil-shaped head of the binding bolt entails a spreading force to the spiral thickenings of the eccentric worm, one of the disks of the eccentric worm frequently breaks off.

In order to incorporate the connection into an element (panel) of furniture, a blind bore must be milled in for placing the eccentric worm and, radially to the blind bore, a through bore must be bored for inserting the binding bolt. By means of standard clamping heads of a diameter of 25 mm for clamping the milling tools, it is impossible to mill and bore bores for binding bolts at a single clamping of the panel. The boring operation must be performed separately from milling.

When making the blind bores, a sufficient thickness of the panel material under the bore has to be taken into account in order to prevent bulging of the panel area below the bore because of the axial loading of the milling tool. Hence a greater panel thickness than necessary for furniture must be used or the eccentric worm dislocates, which requires an additional technological operation and results in the eccentric worm projecting from the panel surface, which impairs its appearance.

SUMMARY OF THE INVENTION

On the basis of the preceding analysis it is obvious that the problem resides in the ratio of the diameter to the height of the eccentric worm.

By measurements and tests of the behaviour of materials that are presently used for non-metal furniture, it has been established that a considerably greater specific pressure per unit area can be applied to the walls of the milled bore in comparison to the specific pressure obtained by analyzed known eccentric worms in clamped condition. This practically means that the diameter of the eccentric worm can be considerably reduced. A smaller diameter means, according to the above analysis, a smaller loading of the bottom of the bore during the milling process and, additionally, the possibility of increasing the milling speed and, particularly, the application of smaller clamping heads for milling tools, which results in the blind bores for eccentric worms and through bores for binding bolts being made during the single clamping of the panel.

According to the present invention, the reduction of the diameter in its relation to the height of the eccentric worm is achieved by manufacturing the latter of a steel band, which is by stepwise punching transformed into cylindrical sleeves, having the following characteristics. The sleeve is (as a result of rolling the band) divided along the cylinder generatrix and at one of its basis planes comprises a pair of mutually confronted cutouts of a rectangular shape for inserting the screwdriver. Proceeding from the dividing line and perpendicularly thereto, the sleeve is embodied in one circumferential direction with a cutout that extends to the other basis plane. In the opposite circumferential direction, in front of the first cutout, there is a gap-like cutout having a semi-circular termination. This second cutout also extends perpendicularly to the dividing line.

Along the gap-like second cutout, starting at its mouth and ending at its circular termination, the wall of the sleeve is thinned from the inner side in an oblique manner on both sides of the cutout. This thinning is performed so that the bottom of the obliqueness begins at the mouth of the cutout, essentially on the mantle surface of the sleeve and at the semi-circular termination essentially ends on the inner surface of the sleeve. Thus, by these two oblique surface portions a spiral is obtained for tightening of the head of the binding bolt, whereat it is obvious that the total pitch of the spiral essentially equals the thickness of the sleeve wall. It equals the thickness of the band from which the sleeve is made.

With an element designed in the above manner, it does not present any problem to reduce its diameter to a value equal to or smaller than its height, whereat the angle of rotation of the element and the total pitch of the spiral are kept as at the known eccentric worm.

BRIEF DESCRIPTION OF THE DRAWINGS

The invention is described in the following example of embodiment, reference being made to the accompanying drawing, wherein:

FIG. 1 is an elevational view of the eccentric worm for a furniture corner connection according to the invention, FIG. 2 is one of the possible side views of the eccentric worm of FIG. 1, FIG. 3 is an opposite side view of the eccentric worm of FIG. 1, FIG. 4 is a sectional elevation along line IV—IV of FIG. 1 with the indication of a tightened binding bolt, FIG. 5 is a plan view of the eccentric worm of FIG. 1.

DESCRIPTION OF THE PREFERRED EMBODIMENTS

The corner connection for furniture includes of an eccentric worm 1 mounted within a first frame element 1', which is essential to the invention, and of a binding bolt 2 mounted within a second frame element 2' known in the prior art.

The eccentric worm 1 is designed as a cylindrical sleeve, which is divided along a cylinder generatrix G. On the edge of the basis plane F1 are a pair of diametrally confronted rectangular cutouts 3, one of which is situated, for manufacturing reasons, in the present embodiment so that its axis of symmetry coincides with the cylinder generatrix G (FIG. 1).

Proceeding from the dividing line and perpendicular to it, there is a cutout 4 in the area above cutout 3. Cutout 4 is led in one circumferential direction in an arc of 90° and reaches to the other basis plane F2 and provides a rounded passage between the horizontal and the vertical sides. In the opposite circumferential direction, in front of the cutout 4, there is a gap cutout 5, which is also led under the right angle with respect to the dividing line and which has a semi-circular termination and also occupies an arc of about 90°.

Further, the wall of the sleeve eccentric worm 1 is thinned in an oblique manner along the gap cutout 5, beginning at the mouth of the cutout 5, at the dividing line, and ending at the circular termination of the cutout 5 on the inner side of the worm 1 and on both sides of the cutout. This thinning is designed so that the bottom 6a of the oblique surface portions 6 (FIGS. 3, 4) at the mouth of the cutout 5 begins essentially on the mantle surface of the worm 1 and ends at the semi-circular termination of the cutout 5 essentially on the inner surface of the worm 1. Consequently, the two oblique surface portions 6 mutually form a spiral curve for guiding the head 7 of the binding bolt 2, wherefrom the denomination "eccentric worm" justly derives.

From the side of the basis plane F2, the inlet recess, which is formed by the cutout 4, is widened for the sake of perfectly inserting the head 7 of the binding bolt 2 when assembling the furniture. This widening is obtained by means of two chamfers 8 as shown in FIG. 5.

From the above execution of the oblique surface portions 6, it is evident that the pitch of the tightening spiral of the worm 1 equals the thickness $\delta$ of the wall of the worm 1.

The eccentric worm construction as described readily permits the ratio of the diameter D to the height H of the worm 1 to be less than or equal to 1.

The embodiment shown is based on manufacturing the worm 1 of steel band by punching. Other alternatives are possible: for example, the generatrix G need not be a straight line but can also be for instance a screw line. The product can also be cast forged and hence be without a dividing line.

We claim:

1. Corner connector for non-metal parts of furniture, comprising:
   a rotary eccentric worm formed as a sleeve member and a binding bolt having a head, said sleeve member including a slit at one end of said sleeve member, a pair of oblique surface portions for receiving said head, arranged along a gap cutout on an inner side of said sleeve member substantially perpendicular to said slit, another cutout facing said gap cutout, extending circumferentially and substantially perpendicular to said slit, said another cutout terminating at another end of said sleeve member, and wherein a bottom of said oblique surface portions begins at a mouth of said gap cutout substantially on a mantle surface of said sleeve member and ends at a semicircular termination of said cutout, substantially on an inner surface of said sleeve member.

2. A corner connector according to claim 1 wherein said sleeve member is made of a steel band.

3. A corner connector for connecting non-metal parts of furniture, comprising:
   a rotary eccentric worm formed as a sleeve member and a binding bolt having a head, said eccentric worm having a first and a second end and including a slit in the wall of said sleeve member beginning at said first end,
   a first gap cutout extending circumferentially within said sleeve wall from one edge of said slit, said gap cutout having a pair of oblique surface portions arranged along said cutout on an inner side of said sleeve member, a bottom of said oblique surface portions beginning at a mouth of said first cutout substantially in a mantle surface of said sleeve member and ending at a semicircular termination of said first cutout substantially on an inner surface of said sleeve member, said two oblique surface portions forming a spiral for receiving and tightening said head, and,
   a second cutout extending circumferentially from an opposite edge of said slit, said second cutout turning gradually about 90° and terminating at said second end of said wall.

4. A corner connector according to claim 3 wherein said sleeve member is made of a steel band.

* * * * *